(12) United States Patent
Deiters et al.

(10) Patent No.: US 9,876,209 B2
(45) Date of Patent: Jan. 23, 2018

(54) BATTERY SEPARATOR WITH IMPROVED OXIDATION STABILITY

(75) Inventors: Jörg Deiters, Norderstedt (DE); Klaus Heinrich Ihmels, Hamburg (DE)

(73) Assignee: Daramic, Inc., North Charleston, SC (US)

( * ) Notice: Subject to any disclaimer, the term of this patent is extended or adjusted under 35 U.S.C. 154(b) by 0 days.

(21) Appl. No.: 13/333,015

(22) Filed: Dec. 21, 2011

(65) Prior Publication Data

US 2012/0094183 A1    Apr. 19, 2012

Related U.S. Application Data

(62) Division of application No. 12/589,156, filed on Oct. 19, 2009, now abandoned, which is a division of application No. 10/509,723, filed as application No. PCT/EP03/03639 on Apr. 8, 2003.

(30) Foreign Application Priority Data

Apr. 12, 2002    (DE) .................................. 102 16 418

(51) Int. Cl.
H01M 2/16    (2006.01)
H01M 10/06    (2006.01)

(52) U.S. Cl.
CPC ......... *H01M 2/1653* (2013.01); *H01M 10/06* (2013.01)

(58) Field of Classification Search
None
See application file for complete search history.

(56) References Cited

U.S. PATENT DOCUMENTS

| | | | |
|---|---|---|---|
| 212,055 A | 2/1879 | Requa | |
| 285,181 A | 9/1883 | Trenholm | |
| 3,351,495 A | 11/1967 | Larsen et al. | |
| 3,933,525 A * | 1/1976 | Palmer et al. | 429/254 |
| 4,024,323 A | 5/1977 | Versteegh | |
| 4,210,709 A * | 7/1980 | Doi | C08J 9/28 429/250 |
| 4,497,831 A * | 2/1985 | Lover et al. | 514/717 |
| 4,592,973 A | 6/1986 | Pemsler et al. | |
| 4,681,750 A | 7/1987 | Johnson et al. | |
| 4,778,601 A | 10/1988 | Lopatin et al. | |
| 4,959,396 A | 9/1990 | Yankov et al. | |
| 5,246,798 A | 9/1993 | Yaacoub | |
| 5,384,211 A | 1/1995 | Choi et al. | |
| 5,525,444 A | 6/1996 | Ito et al. | |
| 5,773,079 A | 6/1998 | Bohnstedt et al. | |
| 5,989,750 A * | 11/1999 | Ohba et al. | 429/251 |
| 6,124,059 A | 9/2000 | Bohnstedt et al. | |
| 6,403,264 B1 | 6/2002 | Bunsch et al. | |
| 7,498,369 B2 * | 3/2009 | Whear et al. | 524/123 |
| 2002/0055323 A1 | 5/2002 | McClain et al. | |
| 2005/0106468 A1 | 5/2005 | Deiters et al. | |
| 2010/0104946 A1 | 4/2010 | Deiters et al. | |

FOREIGN PATENT DOCUMENTS

| | | |
|---|---|---|
| DE | 1267423 B | 5/1968 |
| DE | 1496123 A1 | 3/1969 |
| DE | 1298712 B | 7/1969 |
| DE | 3617318 C2 | 2/1988 |
| DE | 3540718 C2 | 10/1988 |
| DE | 3004659 C2 | 1/1989 |
| DE | 3922160 A1 | 1/1991 |
| DE | 19521727 A1 | 1/1996 |
| DE | 3545615 C3 | 11/1996 |
| DE | 19702757 A1 | 7/1998 |
| EP | 0425784 B1 | 1/1994 |
| EP | 0618629 A1 | 10/1994 |
| EP | 0815602 B1 | 5/1999 |
| EP | 1090433 B1 | 4/2002 |
| EP | 1497872 B1 | 8/2005 |
| GB | 1078895 A | 8/1967 |
| GB | 2044516 A | 10/1980 |
| GB | 2167600 A | 5/1986 |
| JP | 2-155161 A | 6/1990 |
| JP | 4-167356 A | 6/1992 |
| JP | 4-190554 A | 7/1992 |
| JP | 7-130348 A | 5/1995 |
| JP | 8-203493 A | 8/1996 |
| JP | 9-97601 A | 4/1997 |
| JP | 10-31992 A | 2/1998 |
| JP | 2000-133239 A | 5/2000 |
| JP | 2000-182593 A | 6/2000 |
| WO | 99/19921 A1 | 4/1999 |
| WO | 99/67831 A1 | 12/1999 |
| WO | 00/31181 A1 | 6/2000 |

OTHER PUBLICATIONS

Human translation of JP 02-155161, Jun. 1990.*
International Search Report dated Nov. 3, 2003 in corresponding PCT application No. PCT/EP 03/03639.
CZ-Chemie-Technik, 3rd Vol., No. 4 (1974), pp. 129-134, "Hostalen GUR-Prufmethoden and Charakteristik eines verschleiBfesten Werkstoffes", Berzen.
Office Action—Restriction—dated May 5, 2008 in corresponding U.S. Appl. No. 10/509,723.
Office Action dated Oct. 6, 2008 in corresponding U.S. Appl. No. 10/509,723.
Final Rejection dated Apr. 20, 2009 in corresponding U.S. Appl. No. 10/509,723.

(Continued)

*Primary Examiner* — Jonathan Crepeau
(74) *Attorney, Agent, or Firm* — Nields, Lemack & Frame, LLC

(57) ABSTRACT

The invention relates to a thermoplastic polymer-based battery separator, which contains a compound of formula R $(OR^1)_n(COOM^{x+}{}_{1/x})_m$. In said formula, R represents a non-aromatic hydrocarbon group comprising between 10 and 4,200 carbon atoms, which can be interrupted by oxygen atoms, $R^1$ represents H, $-(CH_2)_kCOOM^{x+}{}_{1/x}$ or $-(CH_2)_k-SO_3M^{x+}{}_{1/x}$, whereby k stands for 1 or 2, M represents an alkali or earth alkaline metal ion, $H^+$ or $NH_4{}^+$, whereby not all variables of M are defined simultaneously as $H^+$, n stands for 0 or 1, m stands for 0 or a whole number from 10 to 1,400 and x stands for 1 or 2. The ratio of oxygen atoms to carbon atoms in the compound according to the aforementioned formula ranges between 1:1.5 and 1:30 and n and m cannot simultaneously represent zero.

18 Claims, No Drawings

(56) References Cited

OTHER PUBLICATIONS

Office Action—Restriction—dated Sep. 3, 2010 in corresponding U.S. Appl. No. 12/589,156.
Office Action dated Jan. 11, 2011 in corresponding U.S. Appl. No. 12/589,156.
Final Rejection dated Jul. 29, 2011 in corresponding U.S. Appl. No. 12/589,156.
Journal of Power Sources, vol. 158, Issue 2, Aug. 25, 2006, pp. 1069-1072, "A new polyethylene separator for heavy-duty traction batteries", Deiters, et al.
Valve-Regulated Lead-Acid Batteries, 2004, Ed. By Rand, et al., Chapter 7, pp. 183-205, Separator Materials for Valve-Regulated Lead-Acid Batteries, Ihmels, et al.
Journal of Power Sources, vol. 4071, (2000), pp. 1-12, "Effect of compression on the behaviour of lead-acid batteries", Perrin, et al.
Journal of Power Sources, vol. 105, Issue 2, Mar. 20, 2002, pp. 114-119, "Extending Cycle Life of Lead Acid Batteries: A New Separation System Allows the Application of Pressure on the Plate Group", 8 pages, Perrin, et al.
Journal of Power Sources, vol. 116, Issues 1-2, Jul. 1, 2003, pp. 61-72, "Development of high power VRLA batteries using novel materials and processes", Soria, et al.

* cited by examiner

BATTERY SEPARATOR WITH IMPROVED OXIDATION STABILITY

This application is a divisional of U.S. Ser. No. 12/589,156 filed Oct. 19, 2009, which is a divisional of U.S. Ser. No. 10/509,723 filed Dec. 30, 2004, which is a 371 of PCT/EP03/03639 filed Apr. 8, 2003, which claims priority of German Patent Application No. 10216418.5 filed Apr. 12, 2002, the disclosures of which are incorporated herein by reference.

The invention relates to separators for lead/sulphuric acid accumulators, hereafter called lead accumulator for short, which have an improved oxidation resistance.

The separators used today in lead accumulators are mostly filled, microporous polyolefin separators. These are intended on the one hand to prevent a direct contact and thus short circuits between the electrode plates, and on the other hand to make possible an ionic current flow and offer this the smallest possible resistance. The composition and production of such separators are known per se (cf. e.g. DE-PS 1 267 423, DE-PS 1 298 712, DE-AS 1 496 123, DE-OS 35 45 615, DE-PS 35 40 718 and DE-PS 36 17 318).

According to U.S. Pat. No. 3,351,495, to this end a homogeneous mixture of polyolefin, filler, plasticizer and additives is formed and this is formed into a web-shaped layer. Then the plasticizer and fillers are at least partly removed by extraction. Polyethylene glycol, glycerin and in particular mineral oil are used as plasticizer. To prevent an oxidative degradation of the polyolefin during extrusion the separators can also contain antioxidants such as 4,4-thio-bis-(6-tert-butyl-m-cresol) and 2,6-di-tert-butyl-4-methyl-phenol.

When in use the separators must not only resist the aggressive battery acid but are also exposed, particularly in the area of the positive plate, to oxidative attacks, for example by oxidative lead dioxide and the formation of extremely reactive nascent oxygen and peroxides. In addition to this, lead accumulators are exposed to ever higher ambient temperatures and cycle loads, which further intensifies the oxidative attack.

Although the polyethylene frequently used for the production of the separators does give the separators, in combination with small quantities of antioxidant and a larger quantity of oil, a certain oxidation stability vis-à-vis the aggressive medium of the battery, the separator material can still undergo slow oxidative attack under more difficult conditions of use and finally be destroyed, which results in a deterioration of the mechanical stability of the separator and the formation of cracks and holes and which in the most unfavourable case shortens the battery life through short circuits.

Many measures for improving the oxidation stability of battery separators are known. For example, the oxidative degradation of the separator can be delayed by increasing the separator thickness, the molecular weight of the polymer used to produce the separator or through a significant increase in the polymer content of the separator.

However, an increase in the separator thickness leads to appreciably higher production costs and higher electrical resistances. The ultra-high molecular-weight polyethylene (UHMWPE) customarily used to produce separators also generally already has a molecular weight of $5-7 \times 10^6$ g/mol and a further increase in the molecular weight would lead to considerable process problems. Moreover, although UHMWPE types with a molecular weight of up to approximately $10 \times 10^6$ g/mol are commercially available, the polymer chains of these UHMWPE types are markedly degraded during extrusion by shearing in the extruder, which again substantially reduces the molecular weight. An increase in the polymer content causes the wettability and porosity and thus the electrical resistance of the separator to deteriorate significantly.

It is also known from the state of the art that the process oils used to produce the battery separators can improve the oxidation resistance of the separators. The maximum oil content of the separators is restricted however, because the oil also causes the wettability and porosity of the separator to deteriorate.

DE 30 04 659 C2 discloses separators which contain oils with an aromatics content of at least 40%. Because of their composition, these oils bring about an improvement in the oxidation resistance of the separators. However, process oils with a high aromatics content can encourage the formation of dark, often sticky deposits in the lead accumulator which contaminate the inside and outside of the accumulator case and can block the valve systems.

The prevention of such deposits is the subject-matter of DE 39 22 160 A1, which to this end discloses the use of surfactants, preferably of the amide or amine type.

JP 02155161 A discloses the use of a combination of paraffin oil, antioxidant and a peroxide decomposer based on phosphoric acid to improve the oxidation stability of battery separators at high temperatures. However this does not provide protection against the oxidative effect of nascent oxygen or of the lead dioxide of the positive electrode plate.

JP 07130348 A discloses separators which contain mineral oil in combination with a phenolic resin.

To improve the oxidation stability of pocket separators an increase in the oil content in the fold edge and along the weld edge is proposed in U.S. Pat. No. 5,384,211 and JP 10031992 A.

JP 08203493 A discloses the coating of the edges of separators with an insulating resin in order to suppress the oxidative attack.

JP 2000133239 A describes the coating of the upper part of the separator, which is in contact with the frame and the electrode lug of the positive plate, with a hot-melt adhesive.

The above separators cannot be produced continuously with today's techniques, and the process is thus time-consuming and expensive. Moreover only a partial improvement in oxidation stability is achieved.

It is customary to provide separators with longitudinal ribs on at least one side in order to prevent direct contact of the separator sheet with the positive electrode plate and thus a premature oxidative destruction.

JP 04167356 A and JP 2000182593 A disclose separators which have additional ribs in the area of the weld edges of the separators in order to prevent in a targeted way the formation of cracks through oxidation in this area.

JP 09097601 A discloses separators profiled in a particular way which allow the gas which forms on the positive plate to escape more quickly and are thus intended to reduce its oxidative effect on the separator.

JP 04190554 A describes the addition of glass fibres to the separator material in order to delay a deterioration of the mechanical properties of the separator through oxidation. The introduction of glass fibres into the separator by extrusion is difficult however, because glass fibres on the one hand are dispersible only with difficulty in the separator material and on the other hand break easily during extrusion and block the extruder screens. Also, separators containing glass fibres are not very flexible and tend to break when subjected to a mechanical stress.

Despite considerable efforts, none of the present methods for improving the oxidation resistance of battery separators is completely satisfactory.

Battery separators are known from U.S. Pat. No. 4,024,323 in which at least 40% of the ultra-high molecular-weight polyethylene used for the production of separators are replaced by a copolymer of an olefin and (meth)acrylic acid or a mixture of a polyolefin of low molecular weight and a polymer of (meth)acrylic acid. This is intended to increase the extrusion speed and improve the incorporation of the filler into the polymer. The replacement of at least 40% of the ultra-high molecular-weight polyethylene by low-molecular-weight polymers is disadvantageous, however, because it leads to a deterioration of the mechanical properties of the separator.

The object of the invention is to provide battery separators with high oxidation stability which are easy and inexpensive to produce and which are protected over their whole surface against oxidation.

According to the invention this object is achieved by battery separators which contain a compound with the Formula (I)

$$R(OR^1)_n(COOM^{x+}_{1/x})_m \qquad (I)$$

in which
R is a non-aromatic hydrocarbon radical with 10 to 4200 carbon atoms, preferably 13 to 4200, which can be interrupted by oxygen atoms,
$R^1$ is H, $-(CH_2)_k COOM^{x+}_{1/x}$ or $-(CH_2)_k-SO_3M^{x+}_{1/x}$, preferably H, where k is 1 or 2,
M is an alkali metal or alkaline-earth metal ion, $H^+$ or $NH_4^+$, where not all the variables M simultaneously have the meaning $H^+$,
n is 0 or 1,
m is 0 or an integer from 10 to 1400 and
x is 1 or 2,
the ratio of oxygen atoms to carbon atoms in the compound according to Formula (I) being in the range from 1:1.5 to 1:30 and m and n not being able to simultaneously be 0. However, preferably only one of the variables n and m is different from 0.

By non-aromatic hydrocarbon radicals is meant radicals which contain no aromatic groups or which themselves represent one. The hydrocarbon radicals can be interrupted by oxygen atoms, i.e. contain one or more ether groups.

R is preferably a straight-chain or branched aliphatic hydrocarbon radical which can be interrupted by oxygen atoms. Saturated, uncross-linked hydrocarbon radicals are quite particularly preferred.

Surprisingly it was found that through the use of the compounds of Formula (I) for the production of battery separators, they can be effectively protected against oxidative destruction.

Battery separators are preferred which contain a compound according to Formula (I) in which
R is a hydrocarbon radical with 10 to 180, preferably 12 to 75 and quite particularly preferably 14 to 40 carbon atoms, which can be interrupted by 1 to 60, preferably 1 to 20 and quite particularly preferably 1 to 8 oxygen atoms, particularly preferably a hydrocarbon radical of formula $R^2-[(OC_2H_4)_p(OC_3H_6)_q]-$, in which
$R^2$ is an alkyl radical with 10 to 30 carbon atoms, preferably 12 to 25, particularly preferably 14 to 20 carbon atoms,
p is an integer from 0 to 30, preferably 0 to 10, particularly preferably 0 to 4 and
q is an integer from 0 to 30, preferably 0 to 10, particularly preferably 0 to 4,
compounds being particularly preferred in which the sum of p and q is 0 to 10, in particular 0 to 4,
n is 1 and
m is 0.

Formula $R^2-[(OC_2H_4)_p(OC_3H_6)_q]-$ is to be understood as also including those compounds in which the sequence of the groups in square brackets differs from that shown. For example according to the invention compounds are suitable in which the radical in brackets is formed by alternating $(OC_2H_4)$ and $(OC_3H_6)$ groups.

Additives in which $R^2$ is a straight-chain or branched alkyl radical with 10 to 20, preferably 14 to 18 carbon atoms have proved to be particularly advantageous. $OC_2H_4$ preferably stands for $OCH_2CH_2$, $OC_3H_6$ for $OCH(CH_3)CH_2$ and/or $OCH_2CH(CH_3)$.

As preferred additives there may be mentioned in particular alcohols (p=q=0; m=0) primary alcohols being particularly preferred, fatty alcohol ethoxylates (p=1 to 4, q=0), fatty alcohol propoxylates (p=0; q=1 to 4) and fatty alcohol alkoxylates (p=1 to 2; q=1 to 4) ethoxylates of primary alcohols being preferred. The fatty alcohol alkoxylates are for example accessible through reaction of the corresponding alcohols with ethylene oxide or propylene oxide.

Additives of the type m=0 which are not, or only difficulty, soluble in water and sulphuric acid have proved to be particularly advantageous.

Also preferred are battery separators which contain a compound according to Formula (I), in which
R is an alkane radical with 20 to 4200, preferably 50 to 750 and quite particularly preferably 80 to 225 carbon atoms,
M is an alkali metal or alkaline-earth metal ion, $H^+$ or $NH_4^+$, in particular an alkali metal ion such as $Li^+$, $Na^+$ and $K^+$ or $H^+$, where not all the variables M simultaneously have the meaning $H^+$,
n is 0,
m is an integer from 10 to 1400 and
x is 1 or 2.

As suitable additives there may be mentioned here in particular polyacrylic acids, polymethacrylic acids and acrylic acid-methacrylic acid copolymers, whose acid groups are at least partly, i.e. preferably 40%, particularly preferably 80%, neutralized. The percentage refers to the number of acid groups. Quite particularly preferred are poly(meth)acrylic acids which are present entirely in the salt form. By poly(meth)acrylic acids are meant polyacrylic acids, polymethacrylic acids and acrylic acid-methacrylic acid copolymers. Poly(meth)acrylic acids are preferred and in particular polyacrylic acids with an average molar mass $M_w$ of 1,000 to 100,000 g/mol, particularly preferably 1,000 to 15,000 g/mol and quite particularly preferably 1,000 to 4,000 g/mol. The molecular weight of the poly(meth)acrylic acid polymers and copolymers is ascertained by measuring the viscosity of a 1% aqueous solution, neutralized with sodium hydroxide solution, of the polymer (Fikentscher's constant).

Also suitable are copolymers of (meth)acrylic acid, in particular copolymers which, besides (meth)acrylic acid contain ethylene, maleic acid, methyl acrylate, ethyl acrylate, butyl acrylate and/or ethylhexyl acrylate as comonomer. Copolymers are preferred which contain at least 40 wt.-%, preferably at least 80 wt.-% (meth)acrylic acid monomer, the percentages being based on the acid form of the monomers or polymers.

To neutralize the polyacrylic acid polymers and copolymers, alkali metal and alkaline-earth metal hydroxides such as potassium hydroxide and in particular sodium hydroxide are particularly suitable.

Suitable additives according to the invention are known and are commercially available.

As well as the named additives the separators can alternatively or additionally contain compounds which can form the additives according to the invention. Preferred are compounds which, when the separators are used for the intended purpose release suitable additives, for example by hydrolysis with the battery acid. Particularly suitable substances of this type are esters which form OH-group-containing compounds of Formula (I). These include for example phthalic acid esters of the above-named alcohols.

The battery separators can be provided in various ways with the additive or additives. The additives can for example be applied to the separator when it is finished (i.e. after the extraction) or added to the mixture used to produce the separator. According to a preferred embodiment the additive or a solution of the additive is applied to the surface of the separator. This variant is suitable in particular for the application of non-thermostable additives and additives which are soluble in the solvent used for the subsequent extraction. Particularly suitable as solvents for the additives according to the invention are low-molecular-weight alcohols, such as methanol and ethanol, as well as mixtures of these alcohols with water. The application can take place on the side facing the negative electrode, the side facing the positive electrode or on both sides of the separator. In the case of an application on one side, an application to the side of the separator facing the positive electrode plate is preferred.

The application may also take place by dipping the battery separator in the additive or a solution of the additive and subsequently optionally removing the solvent, e.g. by drying. In this way the application of the additive can be combined for example with the extraction often applied during separator production.

Another preferred option is to mix the additive or additives into the mixture of thermoplastic polymer and optionally fillers and other additives which is used to produce the battery separators. The additive-containing homogeneous mixture is then formed into a web-shaped material. Because this usually occurs by extrusion at high temperature, difficulty volatile and thermostable additives which are difficulty soluble in the solvent used for extraction, such as polyacrylic acid polymers and copolymers or their salts, are particularly suitable for this.

The additives can be used alone or as a mixture of two or more additives. Mixtures of one or more of the additives according to the invention with surfactants, defoamers and other additives can also be used.

The additives used according to the invention are preferably used in a quantity of 0.5 to 5.0 wt.-% particularly preferably 1.0 to 5.0 wt.-%, quite particularly preferably 1.5 to 4.0 wt.-% and in particular 2.0 to 3.5 wt.-% relative to the mass of the separator after the extraction.

The additives used to produce the separators preferably have a high boiling point. Additives with a boiling point of 250° C. or more have proved to be particularly suitable.

The additives used according to the invention are suitable for combining with all separators which are liable to oxidative attacks, in particular for combining with separators based on thermoplastics. Separators which, as well as a thermoplastic, also contain a filler and oil are quite particularly preferred.

Preferably the additives are combined with separators based on polyolefins, particularly preferably filler-containing polyolefins which can be produced by hot-forming such as extrusion or pressing, and subsequent extraction. The additives are however also suitable for the protection of separators which contain polyolefin threads or fibres, e.g. separators in the form of fleeces.

Preferred polyolefins are polyethylenes, ultra-high molecular-weight polyethylene being particularly preferred according to the invention. Ultra-high molecular-weight polyolefin with an average molecular weight by weight of at least 300,000, preferably at least $1.0 \times 10^6$ and particularly preferably at least $5.0 \times 10^6$ g/mol is quite particularly preferred.

The molecular weight of the polyethylene is measured by the Margolies equation: $M=5.37 \times 10^4 \ [\eta]^{1.49}$; with $\eta$=reduced specific viscosity in dl/g (Josef Berzen, CZ Chemie-Technik, $3^{rd}$ Volume (1974) No. 4, p. 129).

However polypropylene, polybutene, polystyrene, ethylene-propylene copolymers, ethylene-hexylene copolymers, ethylene-butene copolymers, propylene-butene copolymers and ethylene-propylene-butene copolymers are also suitable.

The separators according to the invention preferably contain 10 to 100 wt.-%, particularly preferably 15 to 50 wt.-% and quite particularly preferably 20 to 40 wt.-% polymer, in particular ultra-high molecular-weight polyethylene, relative to the sum of the weights of filler and polymer.

A filler preferred according to the invention is $SiO_2$, quite particularly preferred fillers are amorphous precipitation silicas. Oxides and hydroxides of silicon, aluminium and titanium as well as mica, talc, silicates and glass beads are also suitable as fillers. Fillers of this type are disclosed for example in U.S. Pat. No. 3,351,495 and DE 14 96 123 A.

The separators according to the invention preferably contain 0 to 90 wt.-%, particularly preferably 50 to 85 wt.-% and quite particularly preferably 60 to 80 wt.-% filler, relative to the sum of the weights of filler and polymer, silicas preferably being exclusively used as filler.

The weight ratio of filler to polymer is preferably 0 to 9.0, particularly preferably 1.0 to 5.7 and quite particularly preferably 1.5 to 4.0.

Extractable oils which act on the one hand as plasticizers and on the other hand as pore-formers are in particular used as further additives. The liquids disclosed in DE 12 67 423 A, such as for example process oils, are particularly suited. By oils or process oils are preferably meant mineral oils. The oil content in the separator is preferably 5 to 35 wt.-%, particularly preferably 8 to 30 wt.-%, and quite particularly preferably 10 to 25 wt.-% relative to the total mass of the separator after the extraction.

Apart from the main constituents named above, the separators can contain other customary constituents such as carbon black, antioxidants such as for example alkylidenebisphenols, lubricants, other fillers such as for example talc etc., and optionally also other polymers in more or less secondary quantities. Carbon black is preferably used in a quantity of at most 5 wt.-%, the other additives preferably in a quantity of at most 2 wt.-%, relative in each case to the total mass of the finished separator.

To produce the separators the named materials are carefully mixed in the usual way and then formed into a web-shaped material accompanied by heating. The oil is then extracted from this for example with an organic solvent such as hexane so that the desired porosity is obtained. Finally the separator material is cut to size according to the desired usage form, i.e. preferably cut to the final width, wound up into rolls approximately 1,000 meters in length and packed. The surfaces of the separator can be smooth, ribbed or shaped in any other way. The composition and production of battery separators is sufficiently known from the above-mentioned state of the art. In so far as the additives used according to the invention are soluble in the extraction agent or are able to be extracted with it, they are applied to the separator preferably after the extraction step. The additives can however also be added to the extracting agent and thus be applied to the separator during the extraction.

The separators are mostly used in the form of pockets into which the positive or negative electrode plates are inserted. The pocketed electrode plates are then joined to oppositely-charged non-pocketed electrode plates to form blocks of plates and inserted into a battery container. After filling with sulphuric acid and sealing with a battery block cover the lead accumulator is complete.

The subject-matter of the invention are also lead-sulphuric acid accumulators with at least two oppositely-charged electrode plates which contain at least one battery separator with one of the additives according to the invention.

Apart from the additives used according to the invention the accumulators are customary lead/sulphuric acid accumulators with conventional electrodes and sulphuric acid as electrolyte. Preferably they are starter batteries for motor vehicles. The case can be made of all the customary materials, e.g. polypropylene, hard rubber, acrylic glass, polystyrene, glass etc.

The invention is explained in more detail in the following with reference to embodiments.

EXAMPLES

Examples 1-7

Use of 1-Dodecanol as Additive to Prevent Premature Oxidation of Battery Separators Unless stated otherwise battery separators based on polyethylene (UHMWPE) and precipitation silicic acid are used in the examples. The separators are produced on an extruder according to U.S. Pat. No. 3,351,495 and after extrusion are extracted with hexane to an oil content in the base sheet of approximately 12 wt.-% The weight ratio of filler to polymer that is used is given in the respective examples.

In order to assess the effectiveness of the additives a standardized oxidation test was used (PEROX 80 Test) which largely corresponds to the method recommended by the BCI (Battery Council International) for determining the oxidation stability of battery separators (TM-3.229: Standard test method to determine resistance of battery separator to oxidative degradation using hydrogen peroxide in sulphuric acid as oxidizing medium).

To this end, testpieces from the separator material were treated with a mixture of sulphuric acid and hydrogen peroxide at 80° C. for various time periods and the extension of the material before and after the test was compared. The reduction in extendability is a measure of the degradation and the cross-linking, i.e. the oxidative destruction of the polymer. Separators without additives according to the invention which were tested under identical conditions served as comparison.

The testpieces were bone-shaped in accordance with DIN 53455. The oxidation solution was always freshly prepared and consisted of 360 ml sulphuric acid of density 1.28 g/cm$^3$, 35 ml sulphuric acid of density 1.84 g/cm$^3$ and 105 ml 35% hydrogen peroxide solution. The components were slowly mixed with each other accompanied by stirring in the given order and then heated to 80° C. in a closed glass vessel in a water bath. Two sample holders each with five testpieces were placed in solution and left in the solution for the desired test period. Then the samples were washed acid free with lukewarm water and the extension was measured. To this end the testpieces were stretched to breaking at a test speed of 300 mm/min. The extension in cross machine direction (CMD) (CMD-expansion) was measured. In each of the following tables the average of ten measured values is given. Because the initial extension of the separators can vary for process reasons, the absolute expansions were normalized to the initial expansion:

$$\frac{\text{absolute stretching after } \times \text{h } Perox \text{ Test in \%}}{\text{absolute stretching after 0 h } Perox \text{ Test in \%}} \times 100 =$$

relative expansion after × h *Perox* Test

In examples 2 to 7 separator sheets 160×300 mm in size were coated on one side with an ethanol solution of 1-dodecanol so that after drying there was 0.7 to 7.1 wt.-% 1-dodecanol on the blade. In the examples, unless stated otherwise, all weight percentages refer to the weight of the separator after extraction. An untreated separator served as comparison (Example 1). In examples 1 to 7 the weight ratio of filler to polymer was 2.6 in each case.

The separators coated with the additive were subjected to the oxidation test described above. After the test had ended the separators coated with 1-dodecanol showed a considerably higher residual expansion than the untreated separator (see Table 1). The results compiled in Table 1 prove that 1-dodecanol, even in extreme test conditions (80° C., H$_2$O$_2$) and in small concentrations guarantees improved protection of the separator vis-à-vis oxidative destruction.

TABLE 1

Oxidation resistance of separators after treatment with 1-dodecanol (oxidation test)

| | Example | | | | | | |
|---|---|---|---|---|---|---|---|
| | 1*) | 2 | 3 | 4 | 5 | 6 | 7 |
| Quantity of additive [wt.-%] | 0 | 0.7 | 1.4 | 2.1 | 2.8 | 3.5 | 7.1 |
| Duration of the oxidation test | | | | | | | |
| | Absolute extension [%] | | | | | | |
| 0 h | 263 | 269 | 282 | 266 | 271 | 267 | 291 |
| 20 h | 152 | 186 | 234 | 235 | 233 | 252 | 272 |
| 40 h | 108 | 156 | 204 | 181 | 197 | 249 | 254 |
| 72 h | 0 | 46 | 82 | 112 | 135 | 234 | 247 |
| | Relative extension [%] | | | | | | |
| 72 h | 0 | 17 | 29 | 42 | 50 | 88 | 85 |

*)Comparison example

Example 8

Study of Separators with 1-Dodecanol in the Battery Test

Analogously to Examples 2 to 7 separators were coated with 3.5 wt.-% with 1-dodecanol. The weight ratio of filler to polymer was 2.2, the oil content 12 wt.-% Untreated separators served as comparison. The separators were tested in a lead/sulphuric acid battery. To this end battery cells were assembled from antimony-containing positive plates and negative lead-calcium plates (five positive and four negative plates per cell) with a total capacity of 36 Ah/cell. Three cells were equipped with the dodecanol-coated separators, the other three cells with the untreated separators. The battery was subjected to an intensified stability test at 50° C. according to DIN 43539 Part 2 draft 10/1980. Then the cells were opened and the expansion of the separators in the pocket area and in the fold edge was determined.

The results of the battery test are compiled in Table 2. These show that, even under conditions reflecting those encountered in practice, the additive used offers a noticeable improvement in protection of the separator from oxidative attacks.

TABLE 2

Oxidation resistance of separators after treatment with 1-dodecanol (battery test)

| Measuring point | Separator without additive*) | | Separator with 3.5 wt.-% 1-dodecanol | |
|---|---|---|---|---|
| | before test | after test | before test | after test |
| | Absolute extension [%]** | | | |
| in the pocket area | 493 ± 42 | 357 ± 46 | 513 ± 39 | 551 ± 49 |
| in the fold edge | 493 ± 42 | 316 ± 24 | 513 ± 39 | 429 ± 33 |
| | Relative CMD expansion** | | | |
| in the pocket area | 100% | 72% | 100% | 107% |
| in the fold edge | 100% | 64% | 100% | 84% |

*)Comparison
**)measured after 264 test cycles

Examples 9-11

Use of Fatty Alcohols as Additives to Prevent Premature Oxidation of Battery Separators Analogously to Examples 1 to 7 separators with alcoholic solutions of 1-tetradecanol, 1-hexadecanol and 1-octadecanol were coated on one side. After drying there was in each case a quantity of 3.5 wt.-% of the additive on the separator. The separators were subjected to the oxidation test described in Examples 1 to 7. The results are compiled in Table 3.

Separators which are coated with higher-molecular-weight fatty alcohols also show a clearly improved oxidation stability compared with the untreated separator (Example 1).

TABLE 3

Oxidation resistance of separators after treatment with fatty alcohols (oxidation test)

| | Example | | | |
|---|---|---|---|---|
| | 6 | 9 | 10 | 11 |
| Additive | 1-dodecanol | 1-tetradecanol | 1-hexadecanol | 1-octadecanol |
| Quantity of additive [wt.-%] | 3.5 | 3.5 | 3.5 | 3.5 |

TABLE 3-continued

Oxidation resistance of separators after treatment with fatty alcohols (oxidation test)

| | Example | | | |
|---|---|---|---|---|
| | 6 | 9 | 10 | 11 |
| Duration of the oxidation test | | | | |
| | Absolute extension [%] | | | |
| 0 h | 267 | 271 | 271 | 268 |
| 20 h | 252 | 265 | 274 | 265 |
| 40 h | 249 | 238 | 240 | 238 |
| 72 h | 234 | 212 | 218 | 201 |
| | Relative extension [%] | | | |
| 72 h | 88 | 78 | 80 | 75 |

Examples 12-14

Comparison of the Antioxidative Effect of Process Oil and Dodecanol

It is known from the state of the art that the oxidation resistance of separators can be improved by increasing the level of process oil. In a comparative test the effect of the oil content on the oxidation stability was compared with the effect of the same quantity of an additive according to the invention (1-dodecanol). The results are shown in Table 4. It is to be noted that the additive according to the invention produces a much more noticeable improvement in oxidation resistance. The separators were produced and the test carried out as described in Examples 1 to 7. The weight ratio of filler to polymer was 2.4. In each case the oil was extracted to the content given in the Table.

TABLE 4

Oxidation resistance of separators after treatment with 1-dodecanol and raising of the oil content (oxidation test)

| Example | 12*) | 13*) | 14 |
|---|---|---|---|
| Additive | none | none | 1-dodecanol (3.5 wt.-%) |
| Oil content [wt.-%] | 12.4 | 15.4 | 11.2 |
| Duration of oxidation test | | | |
| | Absolute extension [%] | | |
| 0 h | 407 | 431 | 419 |
| 20 h | 313 | 370 | 406 |
| 40 h | 218 | 346 | 388 |
| 72 h | 99 | 204 | 326 |
| 96 h | 0 | 77 | 218 |
| | Relative extension [%] | | |
| 96 h | 0 | 18 | 52 |

*)Comparison example

Examples 15-18

Use of Alkoxylated Alcohols as Additives to Prevent Premature Oxidation of Battery Separators Analogously to examples 1 to 7 separators were treated with alkoxylated alcohols and then subjected to the oxidation test. The weight ratio of filler to polymer was 2.6. Compounds of the general formula $R^2$—$(OC_2H_4)_p$—OH were studied, $R^2$ and p having the meaning given in Table 5. The results compiled in Table 5 show that the addition products of ethylene oxide on long-chain alcohols can noticeably improve the oxidation resistance of battery separators.

TABLE 5

Oxidation resistance of separators after treatment with fatty alcohol ethoxylates (oxidation test)

| | Example | | | | | |
|---|---|---|---|---|---|---|
| | 1*) | 6 | 15 | 16 | 17 | 18 |
| Additive: $R^2$—$(OC_2H_4)_p$—OH | | | | | | |
| $R^2$ | $C_{12}$ | $C_{12}$ | $C_{12}$ | $C_{16/18}$ | $C_{16/18}$ | $C_{16/18}$ |
| p | — | — | 2 | 2 | 5 | 11 |
| Quantity of additive [wt.-%] | 0 | 3.5 | 3.5 | 3.5 | 3.5 | 3.5 |
| Duration of oxidation test | | | | | | |
| | Absolute expansion [%] | | | | | |
| 0 h | 263 | 267 | 281 | 292 | 279 | 284 |
| 20 h | 152 | 252 | 246 | 242 | 279 | 257 |
| 40 h | 108 | 249 | 224 | 260 | 227 | 234 |
| 72 h | 0 | 234 | 145 | 212 | 159 | 84 |
| | Relative expansion [%] | | | | | |
| 72 h | 0 | 88 | 52 | 73 | 57 | 30 |

*)Comparison example

Example 19

Use of Phthalic Acid Esters as Additives to Prevent Premature Oxidation of Battery Separators Analogously to Examples 1 to 7 separators were prepared and their oil content was set at 12 wt.-% by extraction with hexane. The weight ratio of filler to polymer was 2.2. Differently from Examples 1 to 7, 1 or 2 wt.-% stearyl phthalate was added to the hexane bath for the treatment of the separators according to the invention. The separators were removed from the bath following the extraction and dried at room temperature after dripping. After drying the separators contained 1 or 2 wt.-% stearyl phthalate. According to Table 6 an effective protection of the separator against premature oxidation is achieved by stearyl phthalate. Stearyl phthalate is split by the battery acid into phthalic acid and octadecanol, an additive suitable according to the invention.

TABLE 6

Oxidation resistance of separators after treatment with stearyl phthalate (oxidation test)

| | | Stearyl phthalate | |
|---|---|---|---|
| Additive | none | 1 wt.-% | 2 wt.-% |
| Duration of oxidation test | | | |
| | Absolute extension [%] | | |
| 0 h | 498 | 498 | 512 |
| 72 h | 78 | 211 | 251 |
| | Relative extension [%] | | |
| 72 h | 16 | 42 | 49 |

Examples 20-26

Use of Polyacrylates as Additives to Prevent Premature Oxidation of Battery Separators Analogously to Examples 1 to 7 battery separators with a weight ratio of filler to polymer of 2.2 were prepared based on polyethylene (UHMWPE) and amorphous silicon dioxide. Differently from Examples 1 to 7, polyacrylic acid or the sodium salt of polyacrylic acid were added to the separator material before extrusion, the quantities of polyacrylic acid present in the separator after extraction being given in Table 7. The separators were then subjected to the oxidation test. The results compiled in Table 7 show that salts of polyacrylic acid give an effective protection of the separators against premature oxidation possible. In contrast to this, free polyacrylic acid was practically without effect. The results also show that polyacrylic acids are not washed out of the separator during extraction.

TABLE 7

Oxidation resistance of separators with polyacrylic acid (oxidation test)

| Example | 20*) | 21 | 22 | 23 | 24 | 25 | 26*) |
|---|---|---|---|---|---|---|---|
| Additive | none | Polyacrylic acid | | | | | |
| Average molecular weight [g/mol] | — | 1,200 | 4,000 | 8,000 | 15,000 | 30,000 | 100,000 |
| Form | — | salt**) | salt**) | salt**) | salt**) | salt**) | acid |
| K-value***) | — | 15 | 25 | 30 | 40 | 50 | 80 |
| Concentration [wt.-%] | — | 2.0 | 2.0 | 2.0 | 2.0 | 2.0 | 2.0 |
| Duration of oxidation test | | | | | | | |
| | Absolute extension [%] | | | | | | |
| 0 h | 508 | 522 | 468 | 530 | 499 | 504 | 447 |
| 20 h | 420 | 446 | 413 | 410 | 456 | 485 | 418 |

TABLE 7-continued

| Oxidation resistance of separators with polyacrylic acid (oxidation test) | | | | | | |
|---|---|---|---|---|---|---|
| 40 h | 303 | 427 | 394 | 413 | 450 | 457 | 211 |
| 72 h | 21 | 333 | 273 | 240 | 244 | 224 | 16 |
| Relative extension [%] | | | | | | |
| 72 h | 4 | 64 | 58 | 45 | 49 | 44 | 4 |

*)Comparison example
**)The sodium salt of polyacrylic acid was used (completely neutralized form)
***)Fikentscher's constant, measured in a 1-% aqueous solution neutralized with sodium hydroxide solution, parameter for characterization of the degree of polymerization and the molar mass Examples 27-28

Use of Polyacrylic Acid Copolymers as Additives to Prevent Premature Oxidation of Battery Separators Analogously to Examples 20 to 26 separators were prepared and tested which contained polyacrylic acid copolymers instead of polyacrylic acid. In Example 27 the polymer Sokolan CP 10 was used, in Example 28 Sokolan CP 10 S (both Fa. BASF, Ludwigshafen). The results are shown in Table 8. Here also the salt form of the polymers produces a good oxidation protection while the acid form is practically without effect.

TABLE 8

| Oxidation resistance of separators with polyacrylic acid copolymers (oxidation test) | | | |
|---|---|---|---|
| Example | 23*) | 27 | 28 |
| Additive | none | Polyacrylic acid copolymer | |
| Average molecular weight [g/mol] | — | 4,000 | 4,000 |
| Form | — | salt**) | acid |
| Concentration [wt.-%] | — | 2.0 | 2.0 |
| Duration of oxidation test | | | |
| | Absolute extension [%] | | |
| 0 h | 508 | 521 | 556 |
| 20 h | 420 | 465 | 506 |
| 40 h | 303 | 433 | 375 |
| 72 h | 21 | 279 | 43 |
| | Relative extension [%] | | |
| 72 h | 4 | 54 | 8 |

*)Comparison example
**)The sodium salt of polyacrylic acid was used (completely neutralized form)

The invention claimed is:

1. Lead-sulphuric acid accumulator or battery with at least two oppositely-charged electrode plates, comprising at least one non-fibrous extruded and extracted porous battery separator sheet based on thermoplastic, ultra-high molecular-weight polyolefin with an average molecular weight by weight of at least 300,000, said at least one extruded and extracted battery separator sheet comprising, relative to the sum of the weights of filler and polyolefin, 10 to 90 wt.-% polyolefin and a filler to polyolefin weight ratio of 1.0 to 5.7, and, relative to the weight of the separator sheet, 5 to 35 wt.-% residual oil after extraction to achieve the porosity of said porous battery separator and 0.5 to 5.0 wt.-% of a compound according to the Formula (I)

$$ROH \quad (I)$$

in which

R is a non-aromatic hydrocarbon radical with 10 to 4200 carbon atoms, which can be interrupted by oxygen atoms, the ratio of oxygen atoms to carbon atoms in the compound according to Formula (I) lying in the range between 1:1.5 and 1:30, and wherein the compound of Formula (I) is not, or is only difficulty, soluble in each of water and sulphuric acid; and wherein the porous battery separator sheet is formed by a process comprising extrusion of the oil and polyolefin into a sheet and subsequent extraction of at least a portion of the oil from the sheet.

2. Lead-sulphuric acid accumulator or battery according to claim 1, wherein in said Formula (I), R is a hydrocarbon radical with 10 to 180 carbon atoms, which can be interrupted by 1 to 60 oxygen atoms.

3. Lead-sulphuric acid accumulator or battery according to claim 2, wherein R is a hydrocarbon radical of the formula $R^2-[(OC_2H_4)_p] (OC_3H_6)_q]-$, in which $R^2$ is an alkyl radical with 10 to 30 carbon atoms,
p is an integer from 0 to 30, and/or
q is an integer from 0 to 30.

4. Lead-sulphuric acid accumulator or battery according to claim 3, wherein
p is an integer from 0 to 10 and
q is an integer from 0 to 10.

5. Lead-sulphuric acid accumulator or battery according to claim 3, wherein the sum of p and q is smaller than or equal to 10.

6. Lead-sulphuric acid accumulator or battery according to claim 1, wherein the compound according to Formula (I) is not soluble in each of water and sulphuric acid.

7. Lead-sulphuric acid accumulator or battery according to claim 2, wherein the compound according to Formula (I) is not soluble in each of water and sulphuric acid.

8. Lead-sulphuric acid accumulator or battery according to claim 4, wherein the compound according to Formula (I) is not soluble in each of water and sulphuric acid.

9. Lead-sulphuric acid accumulator or battery according to claim 5, wherein the compound according to Formula (I) is not soluble in each of water and sulphuric acid.

10. Lead-sulphuric acid accumulator or battery with at least two oppositely-charged electrode plates, comprising at least one non-fibrous extruded and extracted porous battery separator sheet based on thermoplastic, ultra-high molecular-weight polyolefin with an average molecular weight by weight of at least 1,000,000, said at least one extruded and extracted battery separator sheet comprising, relative to the sum of the weights of filler and polyolefin, 10 to 90 wt.-% polyolefin, as well as a filler to polyolefin weight ratio of 1.0 to 5.7, and, relative to the weight of the separator, 5 to 35 wt.-% residual oil after extraction to achieve the porosity of said porous battery separator and 0.5 to 5.0 wt.-% of a compound according to the Formula (I)

$$ROH \quad (I)$$

in which

R is a non-aromatic hydrocarbon radical with 10 to 4200 carbon atoms, which can be interrupted by oxygen atoms, the ratio of oxygen atoms to carbon atoms in the compound according to Formula (I) lying in the range between 1:1.5 and 1:30, and wherein the compound of Formula (I) is not, or is only difficulty, soluble in each of water and sulphuric acid, and wherein the porous battery separator sheet is formed by a process comprising extrusion of the oil and polyolefin into a sheet and subsequent extraction of at least a portion of the oil from the sheet.

11. Lead-sulphuric acid accumulator or battery according to claim 1, wherein said filler is present in an amount of from 50 to 85 wt. %.

12. Lead-sulphuric acid accumulator or battery according to claim 11, wherein said filler comprises silica.

13. Lead-sulphuric acid accumulator or battery according to claim 10, wherein said filler is present in an amount of from 50 to 85 wt. %.

14. Lead-sulphuric acid accumulator or battery according to claim 13, wherein said filler comprises silica.

15. Lead-sulphuric acid accumulator or battery according to claim 1, wherein said polyolefin is polyethylene.

16. Lead-sulphuric acid accumulator or battery according to claim 10, wherein said polyolefin is polyethylene.

17. Lead-sulphuric acid accumulator or battery according to claim 12, wherein said polyolefin is polyethylene.

18. Lead-sulphuric acid accumulator or battery according to claim 14, wherein said polyolefin is polyethylene.

* * * * *